(12) United States Patent
Kubota et al.

(10) Patent No.: US 8,934,271 B2
(45) Date of Patent: Jan. 13, 2015

(54) STARTUP CIRCUIT, SWITCHING POWER SOURCE IC, AND SWITCHING POWER SOURCE APPARATUS

(75) Inventors: Hideyuki Kubota, Niiza (JP); Satoshi Kondou, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 496 days.

(21) Appl. No.: 13/329,909

(22) Filed: Dec. 19, 2011

(65) Prior Publication Data

US 2012/0163047 A1 Jun. 28, 2012

(30) Foreign Application Priority Data

Dec. 24, 2010 (JP) ................................. 2010-287671

(51) Int. Cl.
*H02M 1/36* (2007.01)
(52) U.S. Cl.
CPC .............. *H02M 1/36* (2013.01); *Y10S 323/901* (2013.01)
USPC ............................................ 363/49; 323/901
(58) Field of Classification Search
USPC ........................ 363/49, 21.08, 21.16; 323/901
See application file for complete search history.

(56) References Cited

U.S. PATENT DOCUMENTS

| 5,477,175 | A | * | 12/1995 | Tisinger et al. | 327/143 |
| 6,002,598 | A | * | 12/1999 | Seinen et al. | 363/49 |
| 7,982,248 | B2 | * | 7/2011 | Saito et al. | 257/256 |
| 2007/0058398 | A1 | * | 3/2007 | Yang et al. | 363/16 |
| 2009/0237965 | A1 | | 9/2009 | Sonobe | |

FOREIGN PATENT DOCUMENTS

| CN | 1864115 A | 11/2006 |
| CN | 101552545 A | 10/2009 |
| JP | 2007-258554 | 10/2007 |

* cited by examiner

*Primary Examiner* — Gary L Laxton
(74) *Attorney, Agent, or Firm* — Oblon, Spivak, McClelland, Maier & Neustadt, L.L.P.

(57) ABSTRACT

A startup circuit includes a MOSFET that is connected between a startup power source and an auxiliary power source made of a smoothing capacitor and passes a startup current from the startup power source to the smoothing capacitor, a JFET that has a drain terminal connected to a drain terminal of the MOSFET and a source terminal connected through a resistor to a gate terminal of the MOSFET, and a pinch-off voltage controller that controls a pinch-off voltage of the JFET to a first reference voltage at startup and to a second reference voltage, which is lower than the first reference voltage, after startup.

8 Claims, 7 Drawing Sheets

STARTUP CIRCUIT, SWITCHING POWER SOURCE IC, AND SWITCHING POWER SOURCE APPARATUS

BACKGROUND OF THE INVENTION

1. Field of the Invention

The present invention relates to a startup circuit for starting up a switching power source apparatus, a switching power source IC with the startup circuit, and a switching power source apparatus with the startup circuit.

2. Description of Related Art

A junction field effect transistor (JFET) is known to have a sufficient startup capacity and a wide stable operating range, and therefore, is used for switching power source ICs and switching power source apparatuses. The JFET has a plurality of source regions for one drain region and dividing the source regions into a plurality of groups equivalently forms a plurality of JFETs. If one JFET is divided into a JFET for applying a gate signal to a startup n-channel MOSFET and a JFET for supplying a current through the startup MOSFET to a capacitance element (a smoothing capacitor), the one JFET is usable as a startup circuit of a switching power source and is effective to increase a startup current supplying capacity and widen an operating range of the switching power source.

Japanese Unexamined Patent Application Publication No. 2007-258554 (Patent Document 1) discloses a JFET capable of providing a sufficient driving capacity and a wide stable operating range, a switching power source IC with the JFET, and a switching power source apparatus with the JFET. FIG. 1 is a circuit diagram illustrating a startup circuit 133 and a switching power source apparatus 100 disclosed in Patent Document 1. In FIG. 1, the switching power source apparatus 100 includes an AC power source 101, a fuse 102, a rectifier 103, a power source capacitor 104, a transformer 105, a diode 107, an output capacitor 108, an output terminal 109, a smoothing capacitor 110, a diode 112, a switching power source IC 120, and an n-type MOSFET 121.

The switching power source IC 120 is connected to the power source capacitor 104 and smoothing capacitor 110 and includes the startup circuit 133 and a control circuit 129. The startup circuit 133 includes a JFET 10 (equivalently having a plurality of JFETs, i.e., JFETs 124 and 125) and a MOSFET 127. The control circuit 129 includes a power source part 131 and a control part 132, the power source part 131 including a MOSFET 134.

The AC power source 101 applies an AC voltage through the fuse 102 to the rectifier 103. The rectifier 103 applies a DC voltage to the power source capacitor 104 that serves as a DC power source. The power source capacitor 104 applies a DC voltage to a primary winding 106 of the transformer 105. The power source capacitor 104 also applies the DC voltage to a drain terminal 123 of the JFET 10 (JFETs 124 and 125) of the switching power source IC 120.

Gate terminals of the JFETs 124 and 125 are grounded to fix the potential of the gate terminals to a ground potential GND. A source terminal 203A of the JFET 124 is connected through a resistor 126 to a gate terminal 206 of the n-type MOSFET 127 and the control circuit 129. A source terminal 203B of the JFET 125 is connected to a drain terminal of the MOSFET 127. A source terminal of the MOSFET 127 is connected to the control circuit 129 and smoothing capacitor 110.

The power source part 131 of the control circuit 129 serves as a power source for the control part 132 and includes the n-type MOSFET 134 that is turned on when the smoothing capacitor 110 is charged to a predetermined voltage. The predetermined voltage is a voltage that stably starts the control circuit 129. The power source part 131 includes a constant current circuit (not illustrated) that is connected to the gate terminal 206 and the source terminal of the n-type MOSFET 127, to provide a constant current to each of the JFETs 124 and 125.

When charged, the power source capacitor 104 supplies a current to the drain terminal 123 of the JFET 10, to pass a constant current through the JFET 124. A voltage at the gate terminal 206 is set to be equal to or larger than a threshold voltage of the n-type MOSFET 127 to keep an ON state of the MOSFET 127 while a voltage at a startup circuit output voltage terminal 128 is being lower than a level that is attained when the smoothing capacitor 110 is charged to the predetermined voltage. Accordingly, the MOSFET 127 is ON and a constant current (startup current) passes through the JFET 125 and MOSFET 127, to charge the smoothing capacitor 110.

When the smoothing capacitor 110 is charged up to the predetermined voltage, the control circuit 129 starts the n-type MOSFET 121. When the MOSFET 121 becomes operative, a current caused at a secondary winding 111b of the transformer 105 passes through the diode 112, to charge the smoothing capacitor 110 and continuously operate the MOSFET 121.

When the MOSFET 121 becomes operative, a current caused by a secondary winding 111a of the transformer 105 passes through the diode 107, to charge the output capacitor 108, which outputs a DC voltage and DC current from the output terminal 109.

When the control circuit 129 starts to operate, the n-type MOSFET 134 of the power source part 131 turns on to decrease the voltage level of the gate terminal 206 lower than the threshold value of the n-type MOSFET 127, to turn off the MOSFET 127. When the MOSFET 127 turns off, a voltage level at the source terminal 203B of the JFET 125 increases to cut off a drift region (channel) of the JFET 125, to cut off the drain current (constant current). The JFET 124 causes a voltage drop due to the resistor 126, so that a voltage level at the source terminal 203A of the JFET 124 increases and the drain region (channel) thereof is pinched off to cut off the drain current. Namely, substantially no drain current passes through the JFET 124.

In this way, in the switching power source apparatus 100 of FIG. 1, the gate terminal 206 of the n-type MOSFET 127 is separated from the drain terminal thereof, and therefore, a voltage level at the gate terminal 206 is irrelevant to a voltage level at the drain terminal of the MOSFET 127. Accordingly, a voltage level at the source terminal 203B of the JFET 125 can be decreased nearly to the voltage level at the source terminal of the MOSFET 127. This results in increasing a startup current with respect to the predetermined voltage of the smoothing capacitor 110. Since the voltage level at the source terminal 203B of the JFET 125 can be decreased to about the voltage level at the source terminal of the MOSFET 127, a voltage level at the startup circuit output terminal 128 can be increased when passing the startup current.

SUMMARY OF THE INVENTION

The switching power source disclosed in Patent Document 1 pinches off the JFET 124 at a predetermined voltage after startup. At this time, the pinch-off voltage is applied to the resistor 126 and a current passing through the resistor 126 causes a problem of power loss.

Namely, the startup circuit 133 of FIG. 1 uses the pinch-off voltage of the JFET 124 to turn on the n-type MOSFET 127 and start up the switching power source. Since the MOSFET 127 must be turned on when a voltage Vcc (a voltage of the smoothing capacitor 110) is applied, the pinch-off voltage Vp of the JFET 124 must have a high value equal to or higher than the sum of Vcc, the threshold voltage Vth of the MOSFET 127, and voltage drops of elements concerned.

After startup, the n-type MOSFET 127 must be turned off. For this, the n-type MOSFET 134 of the power source part 131 is turned on to bring the gate voltage of the MOSFET 127 to the ground level GND. At this time, the pinch-off voltage Vp is applied to the resistor 126, to pass a current I that is uselessly consumed. The current I is expressed by Vp/R1, where R1 is a resistance value of the resistor 126. If the pinch-off voltage Vp is reduced to suppress the power consumption, the MOSFET 127 will not turn on when Vcc is applied, i.e., the startup circuit 133 will not start up.

The present invention solves the problem of the related art. The present invention provides a startup circuit capable of keeping a pinch-off state of a JFET of the startup circuit with a minimum power loss, a switching power source IC with the startup circuit, and a switching power source apparatus with the startup circuit.

According to a first aspect of the present invention, the startup circuit includes a MOSFET being connected between a startup power source and an auxiliary power source made of a capacitance element and configured to pass a startup current from the startup power source to the capacitance element, a JFET having a drain terminal connected to a drain terminal of the MOSFET and a source terminal connected through a resistor to a gate terminal of the MOSFET, and a pinch-off voltage controller controlling a pinch-off voltage of the JFET to a first reference voltage at startup and to a second reference voltage, which is lower than the first reference voltage, after startup.

According to a second aspect of the present invention, the pinch-off voltage controller includes a variable voltage source that applies, if a voltage of the capacitance element is lower than a predetermined value, a first gate voltage to a gate terminal of the JFET to control the pinch-off voltage of the JFET to the first reference voltage, and if the voltage of the capacitance element is equal to or higher than the predetermined value, a second gate voltage, which is lower than the first gate voltage, to the gate terminal of the JFET to control the pinch-off voltage of the JFET to the second reference voltage.

According to a third aspect of the present invention, the switching power source IC includes the startup circuit according to the second aspect of the present invention, and a control circuit configured to start to operate when the voltage of the capacitance element is equal to or higher than the predetermined value and control a switching element, wherein the startup circuit and control circuit are arranged on the same semiconductor substrate.

According to a fourth aspect of the present invention, the switching power source apparatus includes a switching element, the startup circuit according to the second aspect of the present invention, and a control circuit configured to start to operate when the voltage of the capacitance element is equal to or higher than the predetermined value and control the switching element.

DESCRIPTION OF PREFERRED EMBODIMENTS

Startup circuits, switching power source ICs with the startup circuits, and switching power source apparatuses with the startup circuits according to embodiments of the present invention will be explained in detail with reference to the drawings.

Embodiment 1

Figure 1:
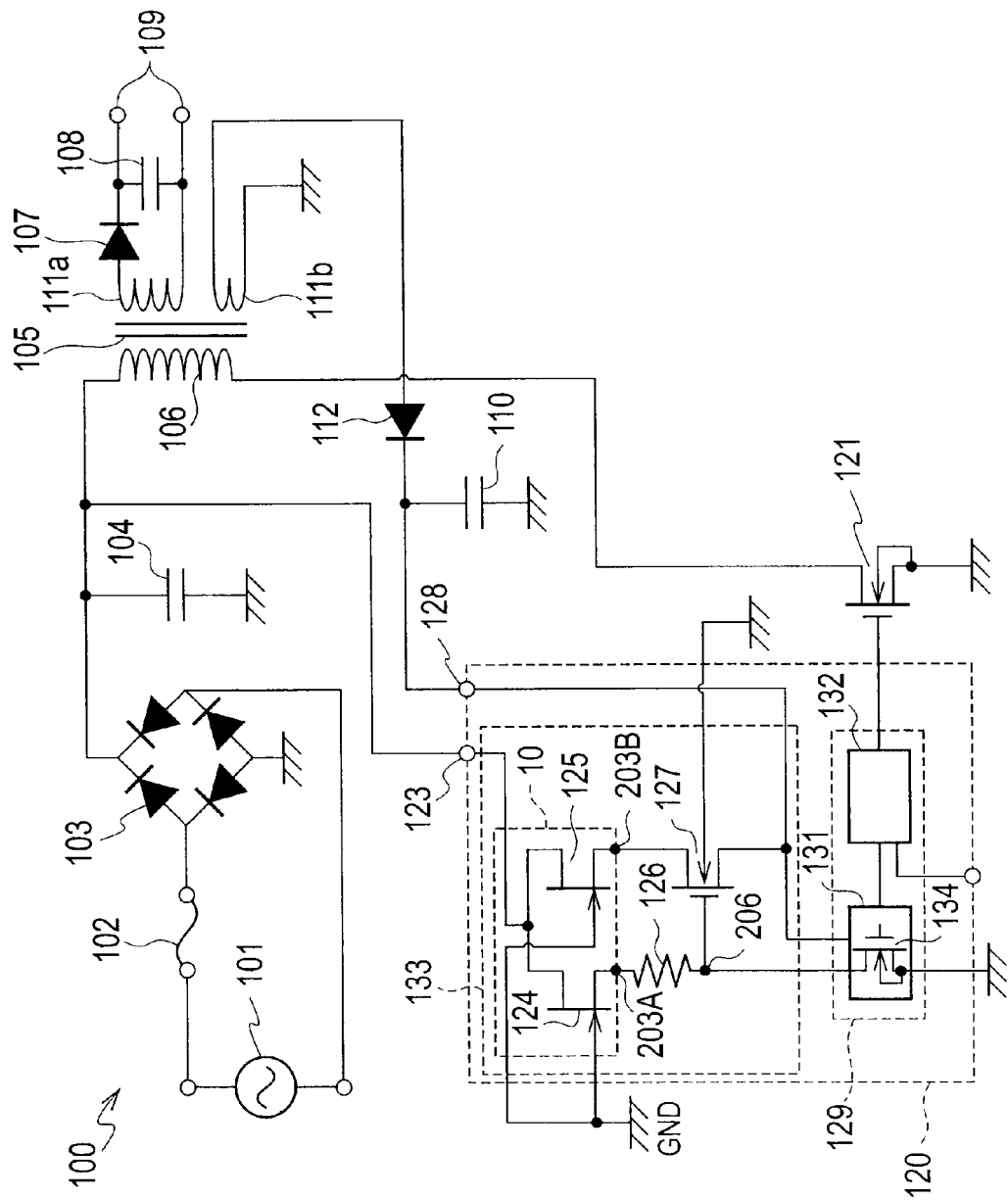
FIG. 1 is a circuit diagram illustrating a switching power source apparatus with a startup circuit of a related art.
Figure 2:
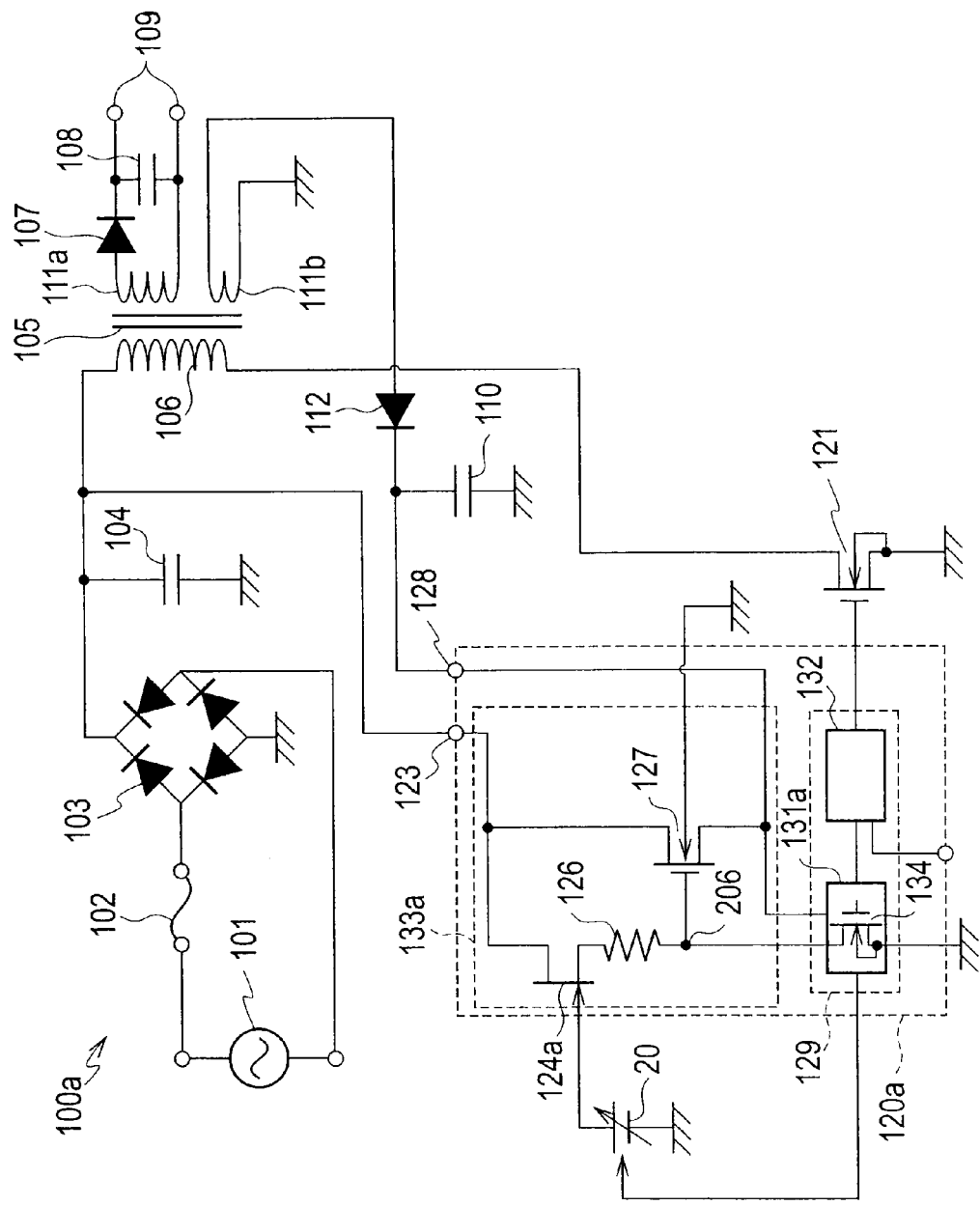
FIG. 2 is a circuit diagram illustrating a switching power source apparatus with a startup circuit according to Embodiment 1 of the present invention.

FIG. 2 is a circuit diagram illustrating a startup circuit 133a according to Embodiment 1 of the present invention, a switching power source IC 120a with the startup circuit 133a, and a switching power source apparatus 100a with the startup circuit 133a. The switching power source apparatus 100a at least includes a switching element MOSFET 121, the startup circuit 133a, and a control circuit 129. What is different from the switching power source apparatus 100 of the related art illustrated in FIG. 1 is that the switching power source apparatus 100a of Embodiment 1 additionally has a variable voltage source 20 and employs a different internal configuration for the startup circuit 133a. The variable voltage source 20 forms a part of the startup circuit 133a.

The switching power source IC 120a is connected to a power source capacitor 104 and a smoothing capacitor 110 and includes the startup circuit 133a and control circuit 129 on the same semiconductor substrate. The control circuit 129 starts to operate when the voltage of the smoothing capacitor 110 becomes equal to or higher than a predetermined value and controls the switching element MOSFET 121. The startup circuit 133a includes a JFET 124a and a MOSFET 127.

Unlike the startup circuit 133 of the related art of FIG. 1 in which the gate electrodes (i.e. gate polysilicon layers, field polysilicon layers, or metal electrode layers) of the JFETs 124 and 125 are grounded, a gate electrode of the JFET 124a according to Embodiment 1 is connected to the variable voltage source 20 so that different voltages are applied to the gate of the JFET 124a. The JFET 125 of the related art of FIG. 1 is not essential for the present invention, and therefore, is not illustrated in FIG. 2. Embodiment 1 may include the JFET 125.

The MOSFET 127 is connected between a startup power source (power source capacitor 104) and a capacitance element (smoothing capacitor 110) serving as an auxiliary power source. The MOSFET 127 passes a startup current from the startup power source to the capacitance element (smoothing capacitor 110).

The JFET 124a has a drain terminal connected to a drain terminal of the MOSFET 127 and a source terminal connected through a resistor 126 to a gate terminal 206 of the MOSFET 127.

The variable voltage source 20 corresponds to the pinch-off voltage controller as stipulated in the claims. The variable voltage source 20 controls a pinch-off voltage of the JFET 124a to a first reference voltage at startup, and after startup, to a second reference voltage that is smaller than the first reference voltage (i.e. first reference voltage >second reference voltage).

In more detail, the variable voltage source 20 applies a first gate voltage to the gate terminal of the JFET 124a when the smoothing capacitor 110 has a voltage lower than a predetermined value at startup, to set the pinch-off voltage of the JFET 124a to the first reference voltage. When the voltage of the smoothing capacitor 110 increases to or above the predetermined value after startup, the variable voltage source 20 applies a second gate voltage that is lower than the first gate voltage (i.e. first gate voltage>second gate voltage) to the gate terminal of the JFET 124a, to set the pinch-off voltage of the JFET 124a to the second reference voltage.

According to Embodiment 1, the determination whether or not the voltage of the smoothing capacitor 110 is lower than the predetermined value is carried out by a power source part 131a in the control circuit 129. The power source part 131a incorporates, for example, a comparator (not illustrated) to compare an output voltage at a startup circuit output voltage terminal 128 with the predetermined value, and according to a result of the comparison, controls ON/OFF of the MOSFET 134 and the voltage of the variable voltage source 20.

According to a result of the comparison made by the power source part 131a, the variable voltage source 20 determines a voltage to be applied to the gate terminal of the JFET 124a.

According to Embodiment 1, the variable voltage source 20 as the pinch-off voltage controller determines whether it is at crafter startup according to the voltage of the smoothing capacitor 110 as mentioned above and changes the voltage applied to the gate terminal of the JFET 124a. It is not always necessary for the pinch-off voltage controller to use the voltage of the smoothing capacitor 110 when determining whether it is at or after startup.

For example, the pinch-off voltage controller may apply the first gate voltage to the gate terminal of the JFET 124a at startup, and after a predetermined time elapses, the second gate voltage that is lower than the first gate voltage to the gate terminal of the JFET 124a.

The remaining configuration of the switching power source apparatus 100a of Embodiment 1 illustrated in FIG. 2 is the same as that of the switching power source apparatus 100 of the related art illustrated in FIG. 1, and therefore, overlapping explanations are omitted.

Operation of the switching power source apparatus 100a with the startup circuit 133a according to Embodiment 1 will be explained. An AC power source 101 applies an AC voltage through a fuse 102 to a rectifier 103. The rectifier 103 applies a DC voltage to the power source capacitor 104 serving as a DC power source. The power source capacitor 104 applies a DC voltage to a primary winding 106 of a transformer 105. The power source capacitor 104 also serves as the startup power source to apply the DC voltage to the drain terminal 123 of the JFET 124a (also the drain terminal of the MOSFET 127) in the switching power source IC 120a.

At this time, the voltage of the smoothing capacitor 110 is lower than the predetermined value because it is at startup. Accordingly, the variable voltage source 20 applies the first gate voltage to the gate terminal of the JFET 124a, to set the pinch-off voltage of the JFET 124a to the first reference voltage. Since the smoothing capacitor 110 is not charged to the predetermined voltage, the power source part 131a keeps the internal MOSFET 134 in an OFF (inoperative) state.

The charged power source capacitor 104 causes a current passing through the drain terminal 123 of the JFET 124a and a constant current passes through the JFET 124a. A voltage at the gate terminal 206 is set to be equal to or higher than a threshold voltage of the MOSFET 127 to keep an ON (operative) state of the MOSFET 127 while a voltage at the startup circuit output voltage terminal 128 is being lower than a level that is attained when the smoothing capacitor 110 is charged to the predetermined value. Accordingly, the MOSFET 127 is ON, a constant current (startup current) passes through the MOSFET 127, and the startup current charges the smoothing capacitor 110.

When the smoothing capacitor 110 is charged to the predetermined voltage, the control circuit 129 starts to operate. Under the control of the control circuit 129, the switching element MOSFET 121 starts to operate. When the MOSFET 121 becomes operative, a current from a secondary winding 111b of the transformer 105 passes through a diode 112 and charges the smoothing capacitor 110. As a result, the MOSFET 121 continuously operates.

When the MOSFET 121 operates, a current caused at a secondary winding 111a of the transformer 105 passes through a diode 107 and charges an output capacitor 108 and a DC voltage and DC current are outputted from an output terminal 109.

When the voltage of the smoothing capacitor 110 becomes equal to or higher than the predetermined value after startup, the variable voltage source 20 applies the second gate voltage that is lower than the first gate voltage to the gate terminal of the JFET 124a, thereby controlling the pinch-off voltage of the JFET 124a to the second reference voltage. Namely, the pinch-off voltage of the JFET 124a decreases from the first reference voltage to the second reference voltage.

When the voltage of the smoothing capacitor 110 becomes equal to or higher than the predetermined value after startup, the MOSFET 134 of the power source part 131a turns on to decrease the voltage level at the gate terminal 206 lower than the threshold value of the MOSFET 127, to turn off the MOSFET 127.

The pinch-off voltage of the JFET 124a is applied to the resistor 126. As mentioned above, the pinch-off voltage of the JFET 124a is controlled to the relatively low second reference voltage, and therefore, a current passing through the resistor 126 is small to suppress the power consumption of the resistor 126.

Consequently, the startup circuit 133a according to Embodiment 1, the switching power source IC 120a with the startup circuit 133a, and the switching power source apparatus 100a with the startup circuit 133a are capable of reducing a power loss that may occur when maintaining the JFET 124a of the startup circuit 133a in a pinch-off state.

The startup circuit 133a according to Embodiment 1, the switching power source IC 120a with the startup circuit 133a, and the switching power source apparatus 100a with the startup circuit 133a have the variable voltage source 20 serving as the pinch-off voltage controller to control a voltage applied to the gate terminal of the JFET 124a. The variable voltage source 20 sets the pinch-off voltage of the JFET 124a to the relatively high first reference voltage at startup, to turn on the MOSFET 127, and after startup, to the relatively low second reference voltage to reduce the power consumption of the resistor 126.

There will be a case that, after startup, the MOSFET 121 causes an insufficient current induced at the secondary winding 111*b* to decrease the voltage of the smoothing capacitor 110. Such a decrease in the voltage of the smoothing capacitor 110 will be prevented if the variable voltage source 20 is configured to determine whether it is at startup or after startup according to the voltage of the smoothing capacitor 110. This configuration stabilizes and improves the operation reliability of the switching power source IC 120*a* and switching power source apparatus 100*a*.

Embodiment 2

Figure 3:
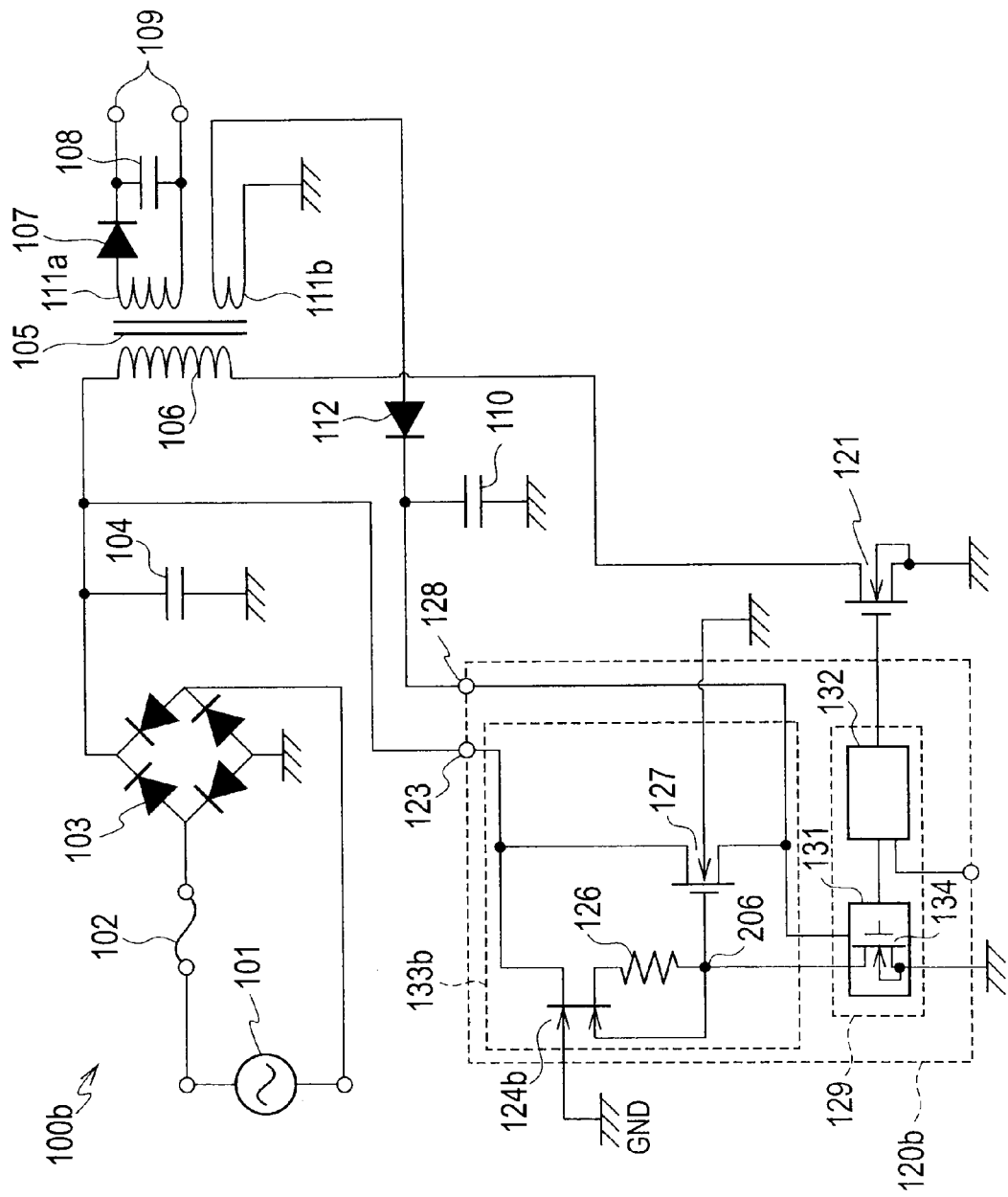
FIG. 3 is a circuit diagram illustrating a switching power source apparatus with a startup circuit according to Embodiment 2 of the present invention.

FIG. 3 is a circuit diagram illustrating a startup circuit 133*b* according to Embodiment 2 of the present invention, a switching power source IC 120*b* with the startup circuit 133*b*, and a switching power source apparatus 100*b* with the startup circuit 133*b*. The switching power source apparatus 100*b* according to the present embodiment at least includes a switching element MOSFET 121, the startup circuit 133*b*, and a control circuit 129. What is different from the switching power source apparatus 100*a* of Embodiment 1 illustrated in FIG. 2 is that the switching power source apparatus 100*b* of the present embodiment has no variable voltage source 20 and employs a different internal configuration for the startup circuit 133*b*.

More precisely, the startup circuit 133*b* includes a double-gate JFET 124*b* and a MOSFET 127. The JFET 124*b* has a first gate terminal (i.e. gate polysilicon layer Poly-Si) and a second gate terminal (i.e. polysilicon substrate P-SUB). The first gate terminal is connected to a gate terminal of the MOSFET 127 and the second gate terminal is grounded.

The first gate terminal corresponds to the pinch-off voltage controller as stipulated in the claims that controls a pinch-off voltage of the JFET 124*a* to a first reference voltage at startup, and after startup, to a second reference voltage that is lower than the first reference voltage (i.e. first reference voltage>second reference voltage).

Figure 4:
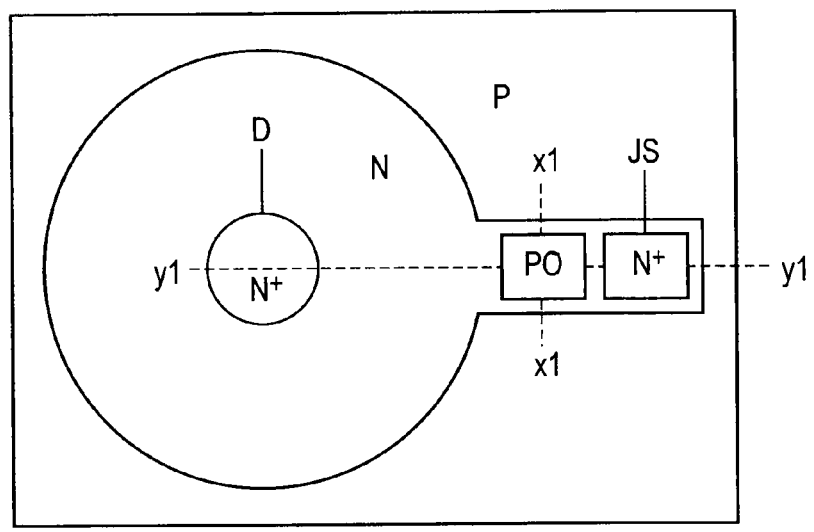
FIG. 4 is a plan view illustrating a JFET in the startup circuit of FIG. 3.
Figure 5:
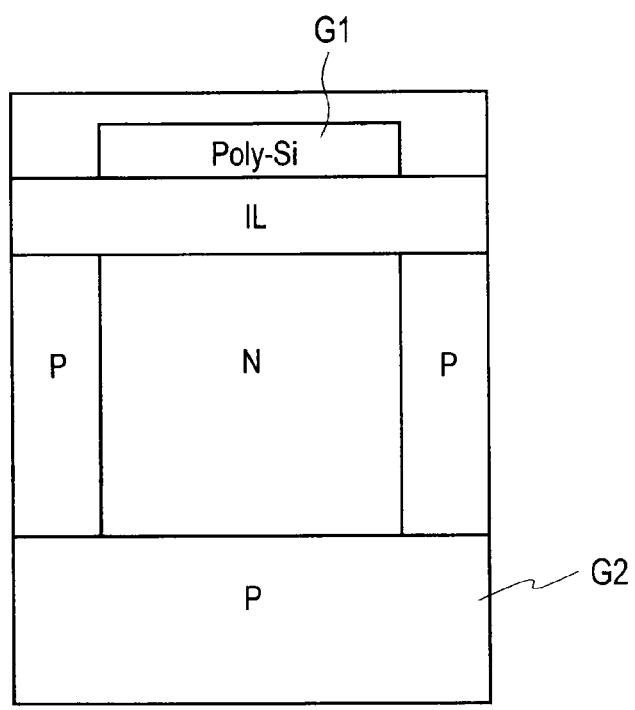
FIG. 5 is a sectional view taken along a line x1-x1 of FIG. 4, illustrating the JFET.
Figure 6:
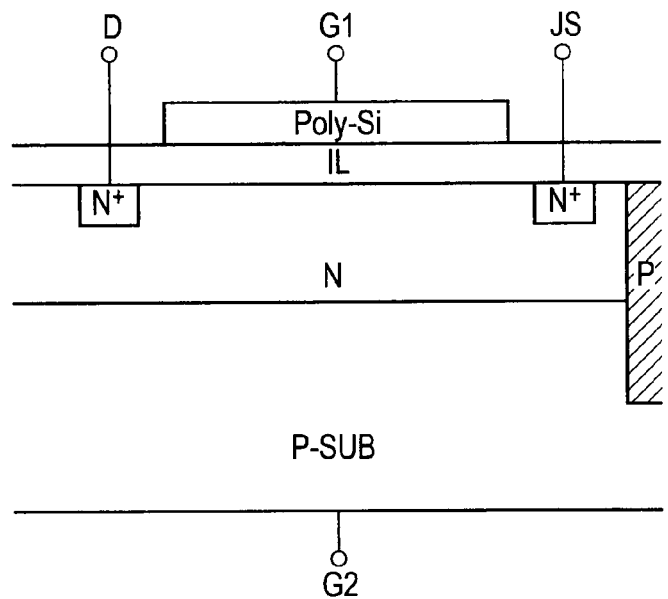
FIG. 6 is a sectional view taken along a line y1-y1 of FIG. 4, illustrating the JFET.

FIG. 4 is a plan view illustrating the JFET 124*b* in the startup circuit 133*b*. In FIG. 3, a drain region is depicted by "D" and a source region is depicted by "JS". FIG. 5 is a sectional view taken along a line x1-x1 of FIG. 4, illustrating the JFET 124*b*. FIG. 6 is a sectional view taken along a line y1-y1 of FIG. 4, illustrating the JFET 124*b*. In FIGS. 5 and 6, the first gate terminal is depicted by "G1"and the second gate terminal is depicted by "G2".

The first gate terminal G1 is made of a polysilicon layer Poly-Si that is arranged on an insulating layer IL that is formed on a drift region of the JFET 124*b* and requires no additional element or additional area. The second gate terminal G2 is a p-type substrate P-SUB or a p-type isolated region. The first gate terminal G1 may be made of a conductive layer such as a metallic layer.

The pinch-off voltage Vp of the JFET 124*b* is determined by a depletion layer spreading between an n-type epitaxial region N-EPI and the p-type substrate P-SUB when a voltage is applied to the epitaxial region N-EPI, i.e., the drain of the JFET 124*b*. It is possible to suppress the spreading of the depletion layer and increase the pinch-off voltage Vp by applying a voltage to the polysilicon layer Poly-Si above the epitaxial region N-EPI.

The polysilicon layer Poly-Si, i.e., the first gate terminal G1 of the JFET 124*b* is connected to the gate of the MOSFET 127. With this, the startup circuit 133*b* applies the pinch-off voltage Vp of the JFET 124*b* (equal to the gate voltage of the MOSFET 127) to the polysilicon layer Poly-Si at startup. Compared with the related art that grounds the polysilicon layer Poly-Si, the startup circuit 133*b* of the present embodiment is able to apply the higher pinch-off voltage Vp to the JFET 124*b*.

The pinch-off voltage Vp of the JFET 124*b* when a voltage is applied to the polysilicon layer Poly-Si may be set to a value at which the MOSFET 127 is operable when Vcc (a voltage of the smoothing capacitor 110) is applied. This setting further reduces the pinch-off voltage Vp of the JFET 124*b* in an OFF state of the MOSFET 127, i.e., in an ON state of a MOSFET 134 and suppresses power consumption after startup.

The remaining configuration of the switching power source apparatus 100*b* of Embodiment 2 is the same as that of the switching power source apparatus 100*a* of Embodiment 1 illustrated in FIG. 2, and therefore, overlapping explanations are omitted.

Operation of Embodiment 2 will be explained. An AC power source 101 applies an AC voltage through a fuse 102 to a rectifier 103. The rectifier 103 applies a DC voltage to a power source capacitor 104 serving as a DC power source. The power source capacitor 104 applies a DC voltage to a primary winding 106 of a transformer 105. The power source capacitor 104 also serves as the startup power source to apply the DC voltage to a drain terminal 123 of the JFET 124*b* (also the drain terminal of the MOSFET 127) in the switching power source IC 120*a*.

At startup, the smoothing capacitor 110 is not charged to a predetermined voltage, and therefore, a power source part 131 of the control circuit 129 maintains the internal MOSFET 134 in an OFF state. As mentioned above, the polysilicon layer Poly-Si (i.e. first gate terminal G1) of the JFET 124*b* is connected to the gate of the MOSFET 127, and therefore, the startup circuit 133*b* increases, at startup, the pinch-off voltage Vp of the JFET 124*b*. Namely, the first gate terminal of the JFET 124*b* with the above-mentioned configuration has a function to serve as a pinch-off voltage controller that controls the pinch-off voltage of the JFET 124*b* to the first reference voltage.

The charged power source capacitor 104 causes a current passing through the drain terminal 123 of the JFET 124*b* to perform a constant current of the JFET 124*b*. As a result, the MOSFET 127 turns on to pass a constant current (startup current) to charge the smoothing capacitor 110.

When the smoothing capacitor 110 is charged to the predetermined voltage, the control circuit 129 starts to operate. Under the control of the control circuit 129, the switching element MOSFET 121 becomes operative to start a switching operation. When the MOSFET 121 operates, a current caused at a secondary winding 111*b* of the transformer 105 passes through a diode 112 and charges the smoothing capacitor 110, to make the MOSFET 121 continue the operation.

When the MOSFET 121 operates, a current caused at a secondary winding 111*a* of the transformer 105 passes through a diode 107 and charges an output capacitor 108, which outputs a DC voltage and DC current from an output terminal 109.

When the voltage of the smoothing capacitor 110 becomes equal to or higher than the predetermined value after startup, the MOSFET 134 turns on to decrease a voltage at the gate terminal 206. As a result, the first gate terminal of the JFET 124*b* controls the pinch-off voltage of the JFET 124*b* to the second reference voltage. Namely, the pinch-off voltage of the JFET 124*b* decreases from the first reference voltage to the second reference voltage and the MOSFET 127 turns off.

The pinch-off voltage of the JFET 124*b* is applied to the resistor 126. As mentioned above, the pinch-off voltage of the JFET 124*b* is controlled to the relatively low second reference voltage, and therefore, a current passing through the resistor 126 is small enough to suppress the power consumption of the resistor 126.

Figure 7:
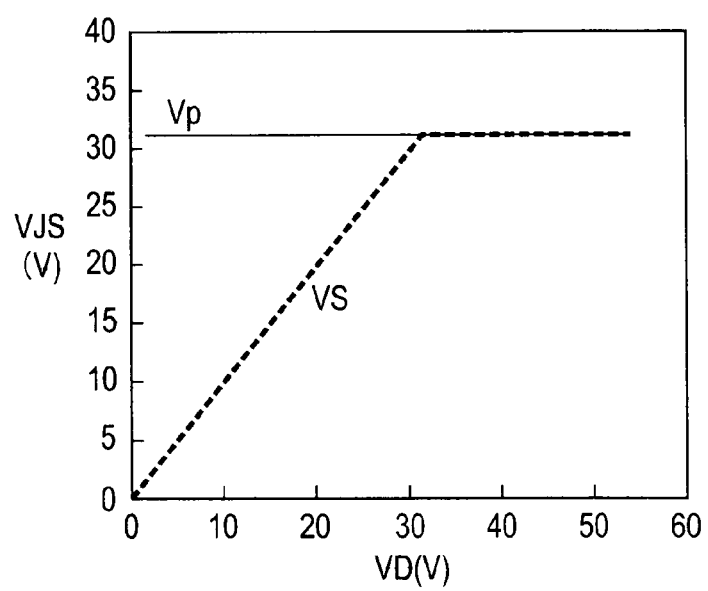
FIG. 7 illustrates a relationship between VD (drain voltage) and VJS (source voltage) of a JFET of a related art.
Figure 8:
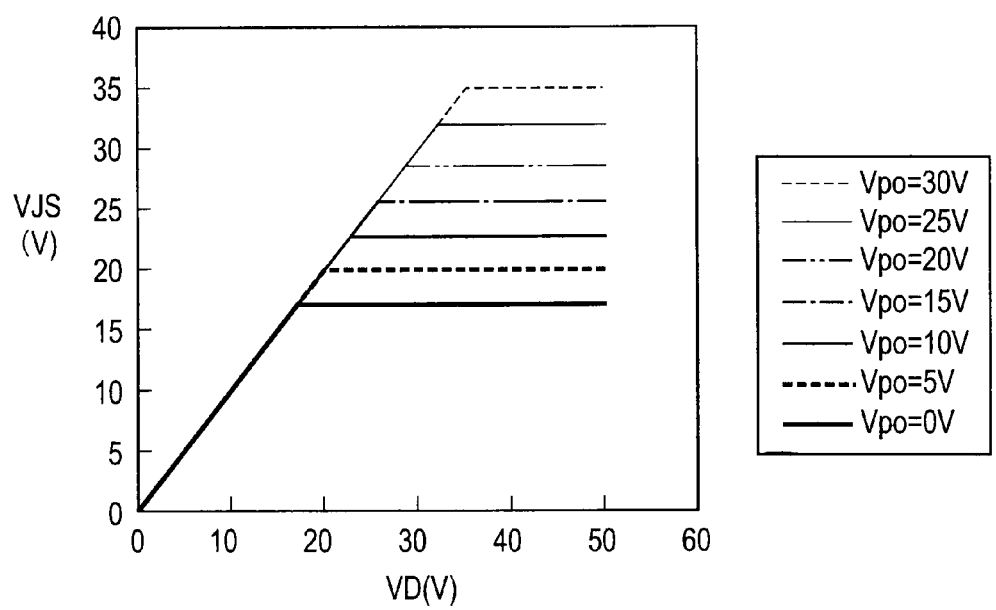
FIG. 8 illustrates a relationship between VD (drain voltage) and VJS (source voltage) of the JFET according to Embodiment 2.

FIG. 7 is a graph illustrating a VD (drain voltage)-VJS (source voltage) characteristic of the JFET according to the related art. FIG. 8 is a graph illustrating VJS (source voltage) characteristic of the double-gate JFET 124b in the startup circuit 133b of the present embodiment as a function of VD (drain voltage).

According to the double-gate JFET 124b of the present embodiment as illustrated in FIG. 8, the pinch-off voltage Vp is 17 [V] when a voltage Vpo applied to the polysilicon layer Poly-Si (i.e. the first gate terminal G1) above the drift region of the JFET 124b is 0 [V] (after startup). On the other hand, the pinch-off voltage Vp is 32 [V] when the voltage Vpo applied to the first gate terminal is 25 [V] (at startup). Namely, the startup circuit 133b according to the present embodiment is capable of substantially halving power consumption after startup compared to the related art.

Although the graph of FIG. 8 illustrates that the voltage Vpo applied to the first gate terminal starts from 0 [V], it is possible to make the voltage Vpo negative. In this case, the start-up circuit 133b of the present embodiment can further reduce the pinch-off voltage Vp, to further reduce the power consumption of the resistor 126.

As mentioned above, the startup circuit 133b according to the present embodiment, the switching power source IC 120b with the startup circuit 133b, and the switching power source apparatus 100b with the startup circuit 133b are capable of reducing a power loss that may occur when maintaining the JFET 124b of the startup circuit 133b in a pinch-off state.

Unlike Embodiment 1 that needs the variable power source 20 and additional elements and areas for the JFET, Embodiment 2 is achievable at lower cost to realize the power consumption reducing effect.

Figure 9:
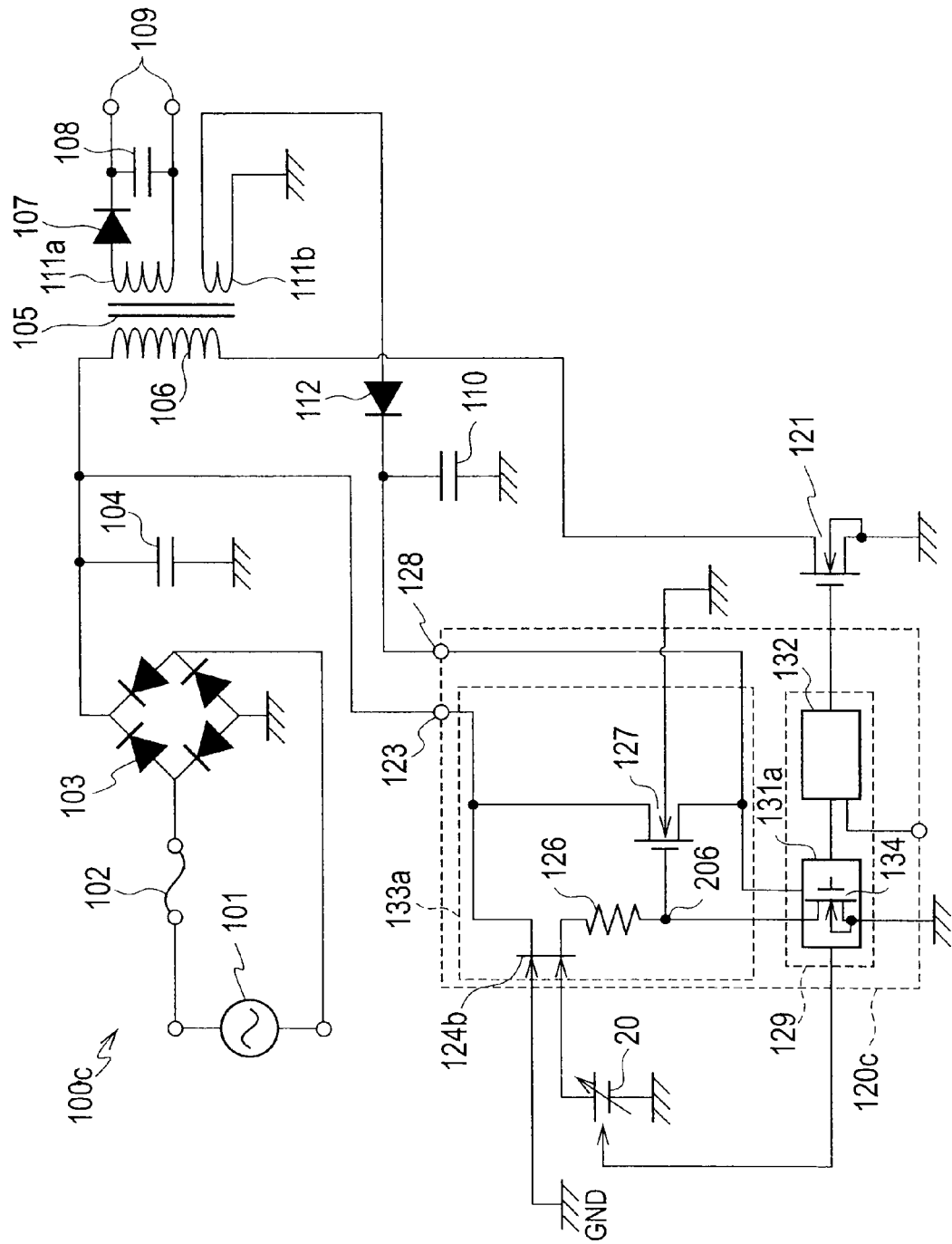
FIG. 9 is a circuit diagram illustrating a switching power source apparatus with a startup circuit according to a modification of Embodiment 2.

The gist of the present invention is to apply a higher gate bias to a JFET at startup and a lower gate bias to the same after startup. To realize this, the present invention may employ configurations other than those explained in connection with Embodiments 1 and 2. For example, FIG. 9 illustrates a modification of Embodiment 2. The modification forms the startup circuit 133a of Embodiment 1 with the JFET 124b of Embodiment 2 instead of the JFET 124a of Embodiment 1. In FIG. 9, the first gate terminal of the JFET 124b is connected to the variable voltage source 20 and the second gate terminal thereof is grounded. The startup circuit according to the modification, a switching power source IC with the startup circuit, and a switching power source apparatus with the startup circuit provide effects similar to the effects provided by Embodiments 1 and 2. The second gate terminal of the JFET 124b of the modification maybe connected to a negative voltage source.

In this way, the startup circuits according to the present invention, the switching power source ICs with the startup circuits, and the switching power source apparatuses with the startup circuits each are capable of reducing a power loss that may occur when maintaining the JFET of the startup circuit in a pinch-off state.

The startup circuits, switching power source ICs, and switching power source apparatuses according to the present invention are applicable to switching power sources of electric appliances.

This application claims benefit of priority under 35 USC §119 to Japanese Patent Application No. 2010-287671, filed on Dec. 24, 2010, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A startup circuit comprising:
a MOSFET being connected between a startup power source and an auxiliary power source of a capacitance element and configured to pass a startup current of the startup power source to the capacitance element;
a JFET having a drain terminal connected to a drain terminal of the MOSFET and a source terminal connected through a resistor to a gate terminal of the MOSFET; and
a pinch-off voltage controller configured to control a pinch-off voltage of the JFET
to a first reference voltage at startup and
to a second reference voltage lower than the first reference voltage after the startup, wherein
the pinch-off voltage controller includes a variable voltage source and the variable voltage source is configured to:
(i) apply a first gate voltage to a gate terminal of the JFET to control the pinch-off voltage of the JFET to the first reference voltage if a voltage of the capacitance element is lower than a predetermined value; and
(ii) apply a second gate voltage being lower than the first gate voltage to the gate terminal of the JFET to control the pinch-off voltage of the JFET to the second reference voltage if the voltage of the capacitance element is equal to or higher than the predetermined value.

2. The startup circuit of claim 1, wherein
the gate terminal of the JFET is a conductive layer formed on an insulating layer being formed on a semiconductor substrate.

3. A switching power source IC comprising:
the startup circuit according to claim 1; and
a control circuit configured to start to operate when the voltage of the capacitance element is equal to or higher than the predetermined value and control a switching element, wherein
the startup circuit and control circuit are arranged on the same semiconductor substrate.

4. A switching power source apparatus comprising:
a switching element;
the startup circuit according to claim 1; and
a control circuit configured to start to operate when the voltage of the capacitance element is equal to or higher than the predetermined value and control the switching element.

5. A startup circuit comprising:
a MOSFET being connected between a startup power source and an auxiliary power source of a capacitance element and configured to pass a startup current of the startup power source to the capacitance element;
a JFET having a drain terminal connected to a drain terminal of the MOSFET and a source terminal connected through a resistor to a gate terminal of the MOSFET; and
a pinch-off voltage controller configured to control a pinch-off voltage of the JFET
to a first reference voltage at startup and
to a second reference voltage lower than the first reference voltage after the startup, wherein:
the gate terminal of the JFET includes a first gate terminal and a second gate terminal being grounded; and
the pinch-off voltage controller is the first gate terminal of the JFET being connected to the gate terminal of the MOSFET.

6. The startup circuit of claim 5, wherein
the first gate terminal is a conductive layer formed on an insulating layer being formed on a semiconductor substrate and
the second gate terminal is the semiconductor substrate.

7. A switching power source IC comprising:
the startup circuit according to claim 5; and
a control circuit configured to start to operate when the voltage of the capacitance element is equal to or higher than the predetermined value and control a switching element, wherein
the startup circuit and control circuit are arranged on the same semiconductor substrate.

8. A switching power source apparatus comprising:
a switching element;
the startup circuit according to claim 5; and
a control circuit configured to start to operate when the voltage of the capacitance element is equal to or higher than the predetermined value and control the switching element.

* * * * *